Jan. 27, 1953  L. W. MUELLER ET AL  2,626,629
CHATTER PREVENTING DEVICE FOR VALVES
Filed Nov. 25, 1947  3 Sheets-Sheet 1
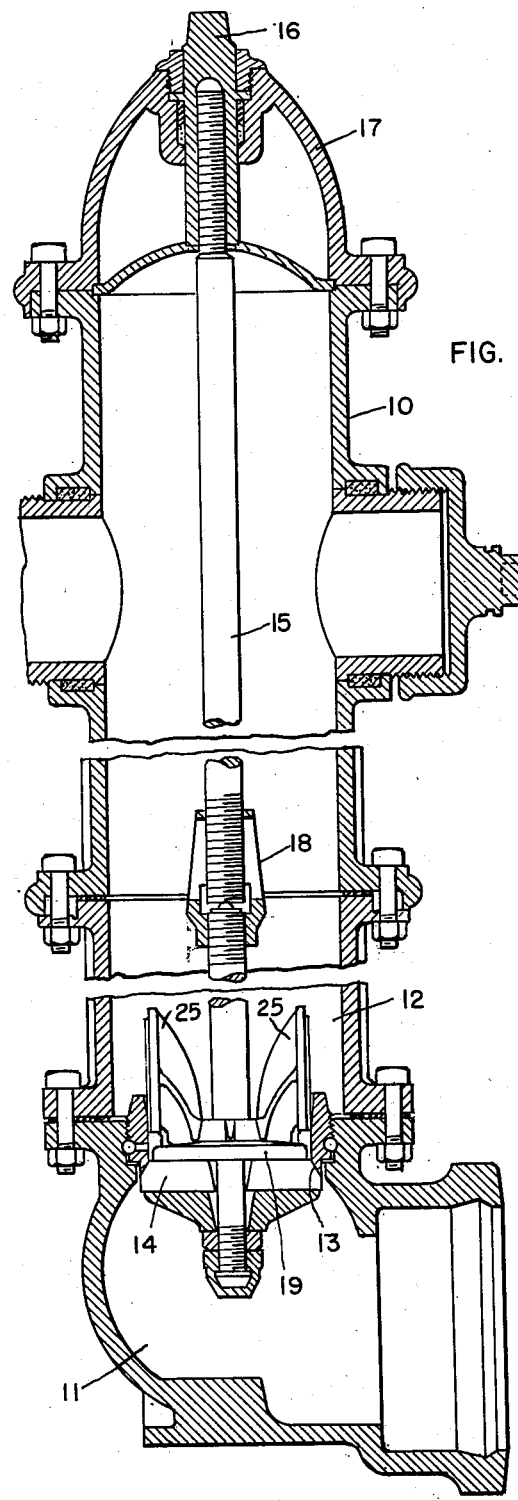
FIG. 1.
FIG. 2.
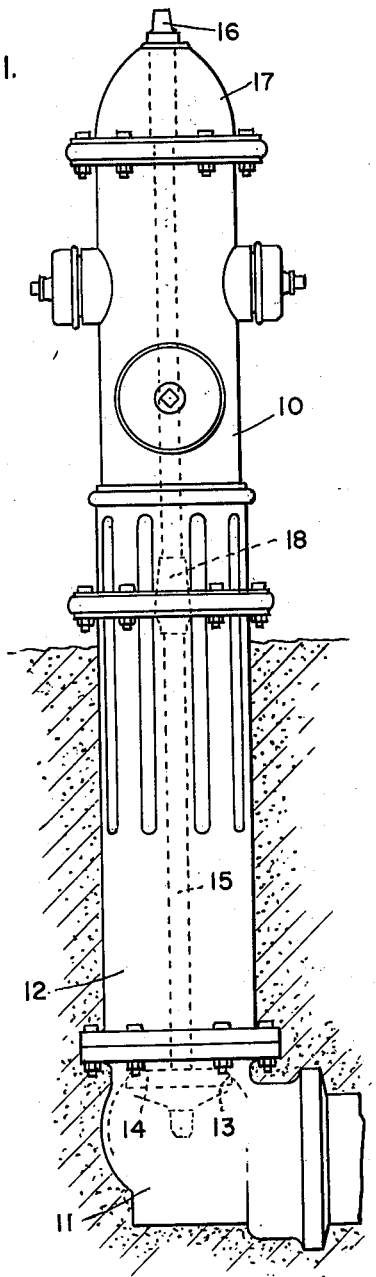
Inventors
LUCIEN W. MUELLER
FRANK H. MUELLER
EARL E. CLINE
Cushman, Darby & Cushman
Attorneys Inventors
LUCIEN W. MUELLER
FRANK H. MUELLER
EARL E. CLINE Patented Jan. 27, 1953

2,626,629

UNITED STATES PATENT OFFICE 2,626,629

CHATTER PREVENTING DEVICE FOR VALVES

Lucien W. Mueller and Frank H. Mueller, Decatur, Ill., and Earl E. Cline, Chattanooga, Tenn., assignors to Mueller Co., Decatur, Ill., a corporation of Illinois Application November 25, 1947, Serial No. 788,006

1 Claim. (Cl. 137—283)

This invention has to do with valves and is here shown in connection with a hydrant valve, for which type of valve it is particularly useful.

Valves of the hydrant type are of relatively heavy construction and when chattering of such valves occurs, injury or derangement of the parts may occur. Chattering of the valves is due to lateral vibrations of the valve under fluid pressure and flow, as distinguished from water hammer which is the result of back and forth surging of the fluid in the line upon sudden stoppage of flow. Lateral play or chattering of the valve frequently results from improper seating of the valve caused, in some instances, by a faulty or distorted valve stem connection or by other imperfections in the valve set up, it being difficult in the usual manufacturing methods to get an absolutely true centering and seating of a valve on its seat. A long or an articulated valve stem, because of play due to distortion of the stem, also will frequently interfere with accurate and proper seating of the valve. Further, where the valve body is made up of separate parts bolted or otherwise secured together, they may be slightly off center and such relation of the non-integral body parts would interfere with the seating of the valve on its seat.

The present development is designed to correct this condition and eliminate valve chatter, by providing the valve with throttling means on its seat entering side, so that the fluid flow through the valve will be equalized and regulated about the valve proper and shifting of the valve due to lateral pressures prevented, thus eliminating chattering of the valve.

In the drawings herewith is illustrated one physical embodiment of the invention, and in said drawings:

Figure 1 is a general view showing a hydrant.

Figure 2 is a view in section of the hydrant shown in Figure 1.

Figure 3:
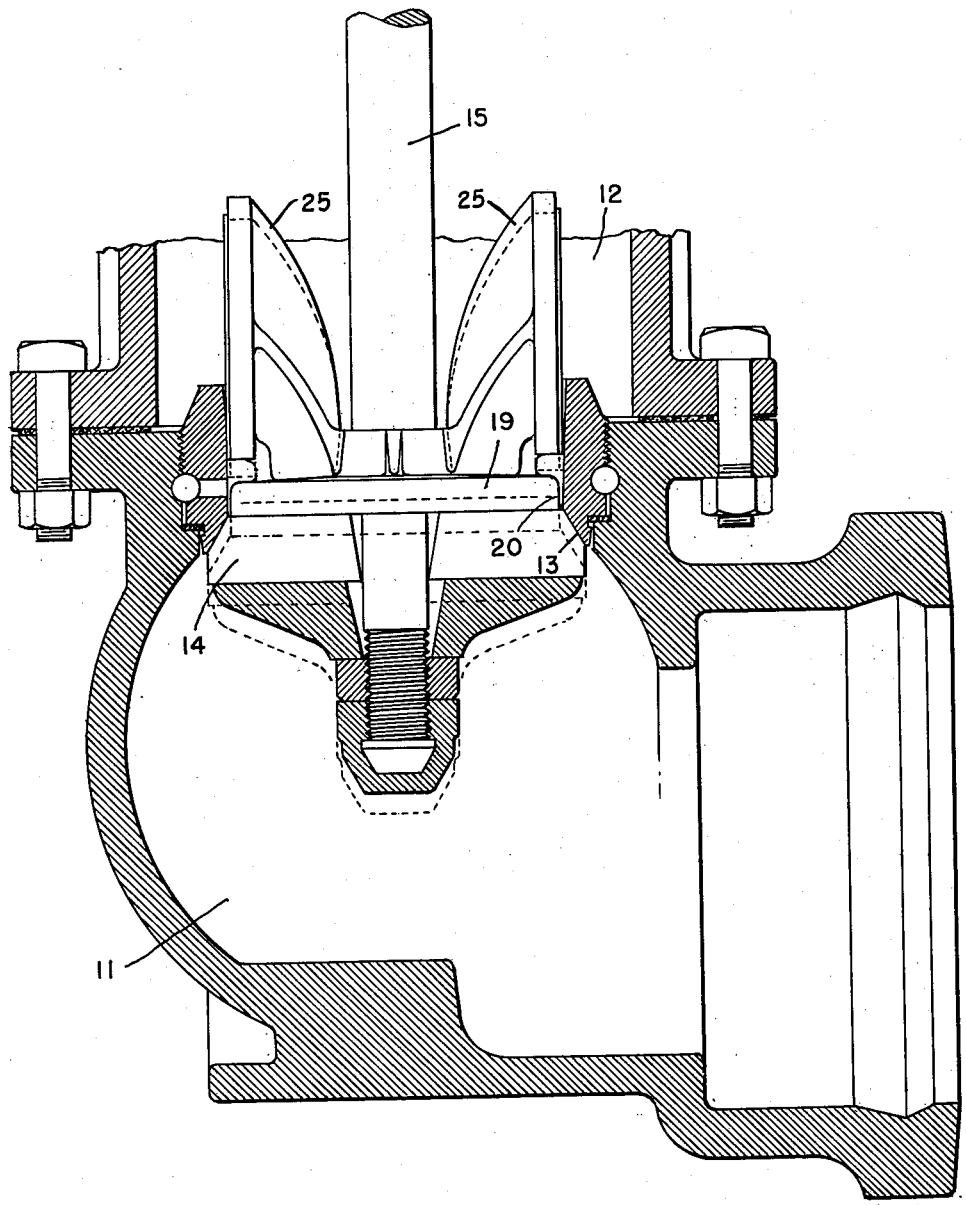
Figure 3 is an enlarged view to show the valve in relation to the valve seat.

Referring to the drawings by numbers, the same numbers designating the same parts in the several views, a typical hydrant is shown having the body 10 containing the inflow chamber 11 and the outflow chamber 12. A valve seat 13 of usual or desired form is provided, on which is seated valve 14, here shown as having a tapered seat-engaging surface cooperating with valve seat 13 having a tapered valve-receiving face. The usual hose outlets are provided in the hydrant body.

As here shown, valve 14 is secured in any suitable fashion to the lower end of valve stem 15 to provide manually operable means for opening and closing valve 14. Above the valve 14 the stem is provided with conventional radial guide vanes 25 slidingly engaged within the throat of the seat 13. At its upper end, the valve stem 15 is connected to valve operating instrumentalities 16 by which the valve may be opened and closed. The stem operating mechanism 16, the stem supporting and the stem bearing are carried by the bonnet 17 of the hydrant, which bonnet is bolted or otherwise secured to the body portion of the hydrant. In this particular instance, the valve stem 15 is provided with a coupling 18 which serves as a break-away coupling such as is used in hydrant constructions. Where a long stem of this character is used, connected at its end to manually operating means and particularly where it is provided with an articulation such as the break-away 18 or other similar coupling, there is danger and likelihood of bending of the stem, or distortion either where it is coupled to the operating means or at any articulation between two parts of the stem. This inevitably will result in an improper seating of the valve, and even if the seating of the valve is only slightly imperfect, it results in setting up unequal stresses under fluid flow laterally of the valve which produce rapid lateral vibrations and chatter. In order to overcome this chattering of the valve, there is provided on the outlet side of the valve 14 a disk 19 having a substantial circumferential area which is of slightly less diameter than the throat of the valve seat 13 and presents a vertical wall 20 of substantial area. The disk 19 will throttle and equalize the flow past the valve as it is initially opened and its relatively close fit to the throat of the valve seat prevents lateral vibrations which otherwise occur. The throttling disk 19 not only serves to eliminate lateral play of the valve and chattering in opening the valve, but also serves to guide the valve to its seat in closing.

Figure 4:
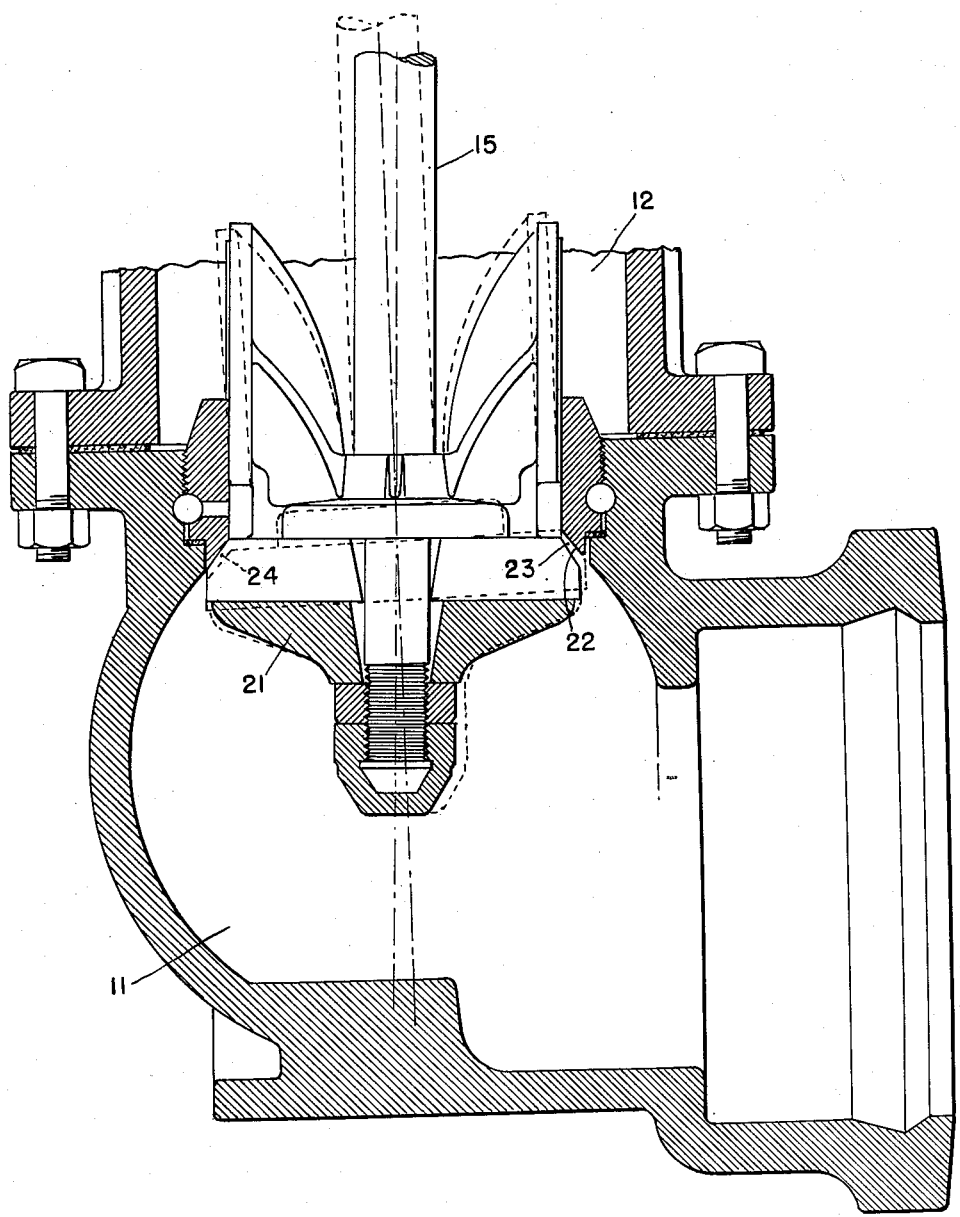
Figure 4 is a view to illustrate the deficiencies of the present form of the valve.

In order to emphasize the importance of this throttling and guiding disk shown in Figs. 2 and 3, there is shown in Fig. 4 a usual valve construction in which the valve is subject to the lateral impulses which produce chatter. The construction shown in Fig. 4 is identical so far as valve seat, valve, and stem are concerned, except that in this old construction, the guiding and throttling disk is absent.

With this construction, when opening force is applied to the valve stem and initial opening of the valve begins, the valve 21, under the influence of fluid flow, will move laterally away from the valve seat 22 to one side of its seated position as shown in Fig. 4, instead of moving symmetrically around its entire circumference away from the valve seat 22, and leave a small space 23 at one side of the valve. Normal line pressure in the inflow chamber 11 will be at once converted to high velocity pressure at the point 23 at that side of the valve driving the valve laterally to the full line position shown in Fig. 4. Pressure in the inlet chamber 11 acting on the other portions of the valve assembly will then return the valve to the position shown in dotted lines in Fig. 4, closing the valve at the point 23 against the seat and opening a similar space 24 at the opposite side of the valve. This back and forth lateral shifting of the valve to and from different points on the valve seat during opening of the valve will continue at a rapid rate and set up valve vibration which results in chatter.

This difficulty, it has been found, is completely overcome by the provision of the relatively closely fitted disk 19 heretofore described, which, as pointed out, equalizes flow past the valve, guides and controls movements of the valve, and prevents the setting up of any unequal pressures, resulting in chattering, such as occur in connection with the valve shown in Fig. 4. As shown in Fig. 4, pressure on that valve results in rapid shifting of the other parts, as indicated in dotted lines in Fig. 4, this lateral shifting being reversed and repeated and resulting in the objectionable valve chattering.

Such changes from the construction shown and described as involve only the exercise of mechanical skill and are comprehended by the appended claim, are to be deemed as within the range of the invention.

We claim:

In a fire hydrant having an elongated barrel provided at the lower end thereof with a valve seat formed with a downwardly-facing frusto-conical sealing surface and the hydrant further having a reciprocating valve member complementary to the seat sealing surface and provided with a stem rigidly fixed thereto and extending through the barrel, the combination of: a plurality of circumferentially spaced guide members mounted for movement with the stem and valve member and guidingly engaged within the seat; and cylindrical disc-like means coaxial and mounted for movement with the valve member and disposed between the valve member and said guide members, said means being of considerable axial extent, only slightly smaller diameter than the minor diameter of the seat sealing surface and, when the valve member is seated, extending upwardly from the upper edge of the seat sealing surface to restrict flow, as the valve member moves to open position, until the latter moves a considerable distance off the seat.

LUCIEN W. MUELLER.
FRANK H. MUELLER.
EARL E. CLINE.

REFERENCES CITED

The following references are of record in the file of this patent:

UNITED STATES PATENTS

| Number | Name | Date |
|---|---|---|
| 673,666 | Sullivan | May 7, 1901 |
| 694,773 | Morris | Mar. 4, 1902 |
| 1,396,501 | Brooks | Nov. 8, 1921 |
| 1,786,885 | Bancroft | Dec. 30, 1930 |
| 1,828,763 | Carnes | Oct. 27, 1931 |
| 1,983,163 | Buckman | Dec. 4, 1934 |
| 2,018,288 | Steirly | Oct. 22, 1935 |
| 2,001,487 | Doherty | May 14, 1935 |